(12) United States Patent
Tsuji et al.

(10) Patent No.: US 10,307,848 B2
(45) Date of Patent: Jun. 4, 2019

(54) ELECTRICAL DISCHARGE MACHINING ELECTRODE WIRE AND MANUFACTURING METHOD FOR SAME

(71) Applicant: Hitachi Metals, Ltd., Tokyo (JP)

(72) Inventors: Takayuki Tsuji, Kitaibaraki (JP); Hiromitsu Kuroda, Hitachi (JP); Tetsuya Tokumitsu, Hitachi (JP); Takamitsu Kimura, Hitachi (JP); Yosuke Shiba, Hitachi (JP); Hiroshi Matsuzaki, Hitachi (JP); Yuichi Komuro, Hitachi (JP); Shingo Amamiya, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 354 days.

(21) Appl. No.: 15/107,119

(22) PCT Filed: Nov. 7, 2014

(86) PCT No.: PCT/JP2014/079650
§ 371 (c)(1),
(2) Date: Jun. 22, 2016

(87) PCT Pub. No.: WO2016/072033
PCT Pub. Date: May 12, 2016

(65) Prior Publication Data
US 2017/0259361 A1    Sep. 14, 2017

(51) Int. Cl.
| | |
|---|---|
| *B23H 7/08* | (2006.01) |
| *C22F 1/08* | (2006.01) |
| *C25D 3/22* | (2006.01) |
| *C25D 5/50* | (2006.01) |
| *C25D 7/06* | (2006.01) |

(52) U.S. Cl.
CPC ............... *B23H 7/08* (2013.01); *C22F 1/08* (2013.01); *C25D 3/22* (2013.01); *C25D 5/50* (2013.01); *C25D 7/0607* (2013.01)

(58) Field of Classification Search
CPC ... B23H 7/08; C25D 5/50; C25D 3/22; C25D 7/0607; C22F 1/08
See application file for complete search history.

(56) References Cited

U.S. PATENT DOCUMENTS

| | | | | |
|---|---|---|---|---|
| 4,736,086 A | * | 4/1988 | Obara | B23H 7/06 219/69.12 |
| 5,756,954 A | * | 5/1998 | Kamiguchi | B23H 7/065 219/69.12 |

(Continued)

FOREIGN PATENT DOCUMENTS

| | | |
|---|---|---|
| JP | H10-128623 A | 5/1998 |
| JP | 2002-126950 A | 5/2002 |

(Continued)

OTHER PUBLICATIONS

International Search Report (ISR) (PCT Form PCT/ISA/210), in PCT/JP2014/079650, dated Feb. 10, 2015.

(Continued)

*Primary Examiner* — Geoffrey S Evans
(74) *Attorney, Agent, or Firm* — McGinn I. P. Law Group, PLLC.

(57) ABSTRACT

An electrical discharge machining electrode wire includes a core including a copper or a copper alloy, and a covering layer covering a periphery of the core and including a zinc. The covering layer includes an inner layer including a γ-phase of copper-zinc based alloy and covering the periphery of the core, and an outer layer including an ε-phase of copper-zinc based alloy and covering a periphery of the inner layer. An x-ray diffraction intensity of (0001) of the ε-phase is more than twice an x-ray diffraction intensity of (332) of the γ-phase.

19 Claims, 5 Drawing Sheets

(56) References Cited

U.S. PATENT DOCUMENTS

| | | | |
|---|---|---|---|
| 5,762,726 A * | 6/1998 | Barthel | B23H 7/08 |
| | | | 148/518 |
| 5,834,726 A * | 11/1998 | Drouet | B23H 7/065 |
| | | | 219/69.12 |
| 5,945,010 A | 8/1999 | Tomalin | |
| 6,447,930 B2 | 9/2002 | Barthel et al. | |
| 8,067,689 B2 | 11/2011 | Tomalin | |
| 9,855,617 B2 * | 1/2018 | Liang | B23H 7/24 |
| 2009/0025959 A1 | 1/2009 | Tomalin | |
| 2014/0110379 A1 * | 4/2014 | Seong | C23C 2/02 |
| | | | 219/69.15 |
| 2017/0014927 A1 * | 1/2017 | Tsuji | B23H 7/08 |

FOREIGN PATENT DOCUMENTS

| | | |
|---|---|---|
| JP | 3549663 B2 | 8/2004 |
| KR | 10-0357695 B1 | 1/2003 |

OTHER PUBLICATIONS

Japanese Office Action dated Dec. 12, 2017 in Japanese Application No. 2016-521807 with an English translation thereof.

Notification of Transmittal of Translation of the International Preliminary Report on Patentability (PCT/IB/338) in PCT Application No. PCT/JP2014/079650 dated May 18, 2017 (and English translation of Written Opinion).

Extended European Search Report dated Mar. 22, 2018 in corresponding European Application No. 14905649.1.

Korean Office Action dated Jul. 10, 2017 with an English translation thereof.

Korean Office Action dated Jan. 26, 2018 in counterpart Korean Patent Application No. 10-2016-7016940, with an English translation thereof.

Japanese Office Action, dated Nov. 16, 2018, in Japanese Application No, 2018-021485 and English Translation thereof.

* cited by examiner

ELECTRICAL DISCHARGE MACHINING ELECTRODE WIRE AND MANUFACTURING METHOD FOR SAME

TECHNICAL FIELD

The present invention relates to an electrode wire for electrical discharge machining and a method for manufacturing the electrode wire for electrical discharge machining.

BACKGROUND ART

Electrical discharge machining electrode wires having a zinc coating around a core formed of copper or a copper alloy (see, e.g., PTLs 1 to 3) are advantageous in that surface finish of a processed portion of a workpiece is better than when using electrical discharge machining electrode wires provided with only a core formed of copper or a copper alloy.

CITATION LIST

Patent Literature

[PTL 1]
  JP-A-2002-126950
[PTL 2]
  JP-B-3549663
[PTL 3]
  U.S. Pat. No. 8,067,689

SUMMARY OF INVENTION

Technical Problem

However, the conventional electrical discharge machining electrode wires having a zinc coating, when wound on a bobbin, etc., and heat-treated in such a coiled state during manufacturing, have a hard kink and this causes a decrease in automatic wire threading performance during electrical discharge machining. For example, when such an electrical discharge machining electrode wire having a zinc coating is broken for some reason during EDM, it is difficult to automatically and promptly (at high speed) insert the electrical discharge machining electrode wire into the processed portion of the workpiece which is being processed. Especially, automatic threading of the electrical discharge machining electrode wire becomes more difficult with an increase in a distance for automatic insertion of the electrical discharge machining electrode wire when, e.g., the thickness of the workpiece is large.

Therefore, it is an object of the invention to provide an electrical discharge machining electrode wire having a zinc coating around a core and excellent in automatic wire threading performance during electrical discharge machining, as well as a method for manufacturing the electrical discharge machining electrode wire.

Solution to Problem

To achieve the above-mentioned object, the invention provides an electrical discharge machining electrode wire and a method for manufacturing the electrical discharge machining electrode wire described below.

[1] An electrical discharge machining electrode wire comprising: a core comprising a copper or a copper alloy; and a covering layer covering a periphery of the core and including a zinc, wherein the covering layer comprises an inner layer including a γ-phase of copper-zinc based alloy and covering the periphery of the core, and an outer layer including an ε-phase of copper-zinc based alloy and covering a periphery of the inner layer, and wherein an x-ray diffraction intensity of (0001) of the ε-phase is more than twice an x-ray diffraction intensity of (332) of the γ-phase.

[2] The electrical discharge machining electrode wire defined by [1], wherein an amount of warpage from an axis along the vertical direction is not more than 80 mm/m when the electrical discharge machining electrode wire is suspended vertically.

[3] The electrical discharge machining electrode wire defined by [1] or [2], wherein the outer layer is an outermost layer.

[4] The electrical discharge machining electrode wire defined by any one of [1] to [3], wherein the core comprises a brass.

[5] A method for manufacturing an electrical discharge machining electrode wire comprising a core comprising a copper or a copper alloy and a covering layer covering a periphery of the core and including a zinc, comprising:
  plating the core with a zinc or a zinc alloy once;
  drawing the plated core; and
  after the drawing, heat treating in a heat treatment condition under which the covering layer comprises an inner layer including a γ-phase of copper-zinc based alloy and an outer layer including an ε-phase of copper-zinc based alloy and covering a periphery of the inner layer and an x-ray diffraction intensity of (0001) of the ε-phase is more than twice an x-ray diffraction intensity of (332) of the γ-phase.

Advantageous Effects of Invention

According to the invention, it is possible to provide an electrical discharge machining electrode wire having a zinc coating around a core and excellent in automatic wire threading performance during electrical discharge machining, as well as a method for manufacturing the electrical discharge machining electrode wire.

DESCRIPTION OF EMBODIMENT

[Electrical Discharge Machining Electrode Wire]

Figure 1:
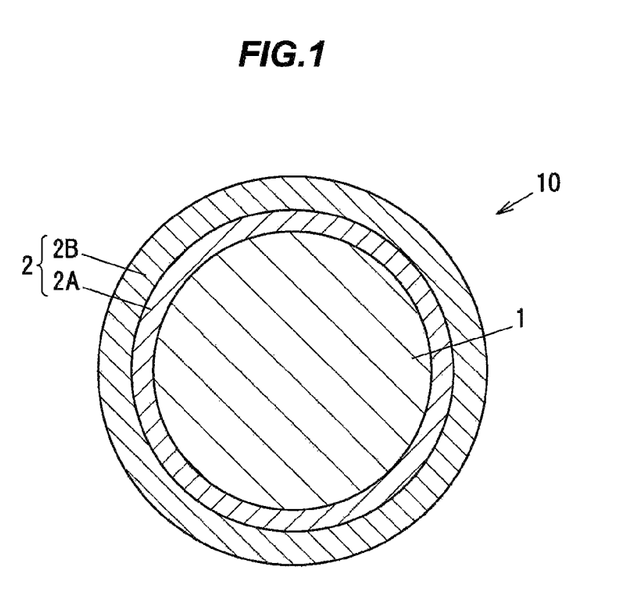
FIG. 1 is a cross sectional view showing a structure of an electrical discharge machining electrode wire in an embodiment of the present invention.

FIG. 1 is a cross sectional view showing a structure of an electrical discharge machining electrode wire in an embodiment of the invention.

As shown in FIG. 1, an electrical discharge machining electrode wire 10 in the embodiment of the invention is provided with a core 1 formed of copper or a copper alloy and a zinc-containing covering layer 2 covering the periphery thereof, and is characterized in that the covering layer 2 has an inner layer 2A containing a γ-phase copper-zinc based alloy and covering the periphery of the core 1 and an outer layer 2B containing an ε-phase copper-zinc based alloy and covering the periphery of the inner layer 2A, and x-ray diffraction intensity of (0001) of the ε-phase is more than twice x-ray diffraction intensity of (332) of the γ-phase.

The core 1 is formed of copper or a copper alloy. The copper alloy is not specifically limited but is preferably brass.

The zinc-containing covering layer 2 provided around the core 1 is formed by applying a zinc plating or a zinc alloy plating. The zinc plating is preferable.

The covering layer 2 has the inner layer 2A containing a γ-phase copper-zinc based alloy and covering the periphery of the core 1 and the outer layer 2B containing an ε-phase copper-zinc based alloy and covering the periphery of the inner layer 2A. The γ-phase is a Cu—Zn alloy generally expressed by $Cu_5Zn_8$ and having a Cu content of about 45 to 35 mass % and a Zn content of about 55 to 65 mass %. Meanwhile, the ε-phase is a Cu—Zn alloy generally expressed by $CuZn_5$ and having a Cu content of about 24 to 12 mass % and a Zn content of about 76 to 88 mass %. The outer layer 2B containing the ε-phase is preferably provided as the outermost layer. A layer formed of a β-phase and a layer formed of a η-phase are preferably absent but may be present as long as the effects of the invention are exerted. As for the inner layer 2A containing the γ-phase, the amount of the γ-phase contained in the inner layer is preferably not less than 85 mass %, more preferably not less than 90 mass %, further preferably not less than 95 mass %, and most preferably 100 mass %. Meanwhile, as for the outer layer 2B containing the ε-phase, the amount of the ε-phase contained in the outer layer is preferably not less than 85 mass %, more preferably not less than 90 mass %, further preferably not less than 95 mass %, and most preferably 100 mass %.

In the covering layer 2, the x-ray diffraction intensity of (0001) of the ε-phase in the outer layer 2B is more than twice the x-ray diffraction intensity of (332) of the γ-phase in the inner layer 2A. The x-ray diffraction intensity of (0001) of the ε-phase is preferably not less than 3 times, more preferably, not less than 4 times the x-ray diffraction intensity of (332) of the γ-phase. There is no specific upper limit but not more than 20 times is preferable. The x-ray diffraction intensity of (0001) of the ε-phase is preferably 500 to 1200 cps, more preferably, 600 to 1100 cps. Meanwhile, the x-ray diffraction intensity of (332) of the γ-phase is preferably 30 to 550 cps, more preferably, 400 to 500 cps. The x-ray diffraction intensities used for comparison are the peak intensities measured by a thin-film method (a method in which an incident x-ray beam is fixed at a small angle (e.g., 10°) to reduce an incident depth of X-ray beam, thereby increasing sensitivity to analyze the surface layer).

The thickness of the covering layer 2 as a whole is preferably 1 to 20 μm. The layer thickness ratio is preferably the outer layer 2B/the inner layer 2A=4/1 to 1/1.

When the electrical discharge machining electrode wire 10 in the embodiment of the invention is suspended vertically, an amount of warpage from an axis along the vertical direction is preferably not more than 80 mm/m. In addition, a difference between the maximum amount and minimum amount of warpage in the longitudinal direction of the electrical discharge machining electrode wire 10 is preferably not more than 30 mm/m.

[Method for Manufacturing the Electrical Discharge Machining Electrode Wire]

A manufacturing method in the embodiment of the invention is to manufacture an electrical discharge machining electrode wire formed by covering a core comprising copper or a copper alloy with a zinc-containing covering layer, and the method includes a step of plating the core with zinc or a zinc alloy once, a step of drawing the plated core, and a step of performing post-wire-drawing heat treatment with the heat treatment conditions under which the covering layer has an inner layer containing a γ-phase copper-zinc based alloy and an outer layer containing an ε-phase copper-zinc based alloy and covering the periphery of the inner layer and the x-ray diffraction intensity of (0001) of the ε-phase is more than twice the x-ray diffraction intensity of (332) of the γ-phase.

The step of plating with zinc or a zinc alloy once and the wire drawing step can be performed by known methods.

The above-described electrical discharge machining electrode wire in the embodiment of the invention can be obtained through the step of performing post-wire-drawing heat treatment. The heat treatment conditions are adjusted so that the inner layer 2A and the outer layer 2B described above can be formed preferably in the range of 100 to 120° C. and 3 to 24 hours, more preferably, 100 to 120° C. and 3 to 18 hours. The temperature and time of heat treatment are appropriately adjusted depending on the diameter of the electrode wire and the thickness of the covering layer. The heat treatment at, e.g., 100° C. is performed preferably for about 6 to 10 hours when the electrode wire has a diameter of Φ0.02, and preferably for about 10 to 17 hours when the electrode wire has a diameter of Φ0.25. Meanwhile, the heat treatment at, e.g., 100° C. is performed preferably for about 3 to 7 hours when the covering layer has a thickness of less than 1.5 μm, and preferably for about 7 to 18 hours when the covering layer has a thickness of not less than 1.5 μm.

[Effects of the Embodiment of the Invention]

The following effects are obtained in the embodiment of the invention.

(1) Based on improvement in straightness of the electrical discharge machining electrode wire having a zinc coating around the core, it is possible to provide an electrical discharge machining electrode wire excellent in automatic wire threading performance during electrical discharge machining, and a method of manufacturing the same. It is possible to obtain an electrical discharge machining electrode wire which allows automatic wire threading as easily as, e.g., an electrical discharge machining electrode wire formed of only brass wire. In addition, by providing the outer layer 2B containing an ε-phase with high zinc content as the outermost layer, it is possible to obtain an electrical discharge machining electrode wire having much better electrical discharge machining characteristics.

(2) In a setup process to proceed a machining operation to another processed portion of the workpiece, it is possible to automatically and promptly insert the electrical discharge machining electrode wire into a very small hole on the workpiece. Therefore, it is easy to proceed the machining operation.

(3) Since the plating step is performed only once during manufacturing, productivity is excellent.

(4) The electrical discharge machining electrode wire has less kinks even when heat-treated (annealed) in a state of being wound into a coiled shape, which provides not only improved automatic wire threading performance but also excellent productivity.

Next, the invention will be described in reference to Examples. However, the invention is not limited to these Examples.

EXAMPLES

[X-ray Diffraction Intensity Measurement]

Figure 2A:
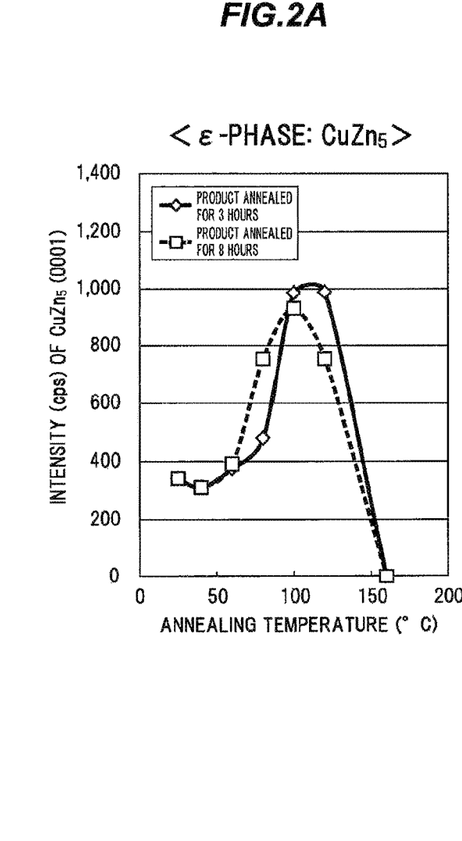
FIG. 2A shows the result of x-ray diffraction intensity measurement, which is the result of measuring intensity of (0001) of the ε-phase ($CuZn_5$) at respective annealing temperatures.
Figure 2B:
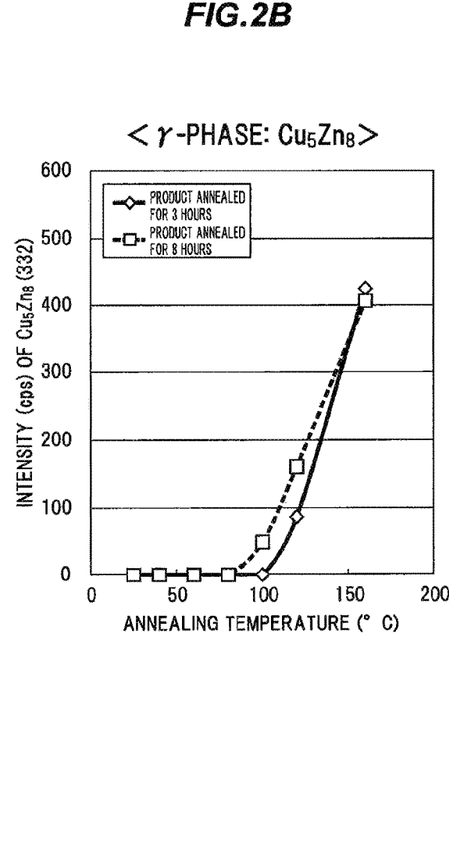
FIG. 2B shows the result of x-ray diffraction intensity measurement, which is the result of measuring intensity of (332) of the γ-phase ($Cu_5Zn_8$) at respective annealing temperatures.
Figure 2C:
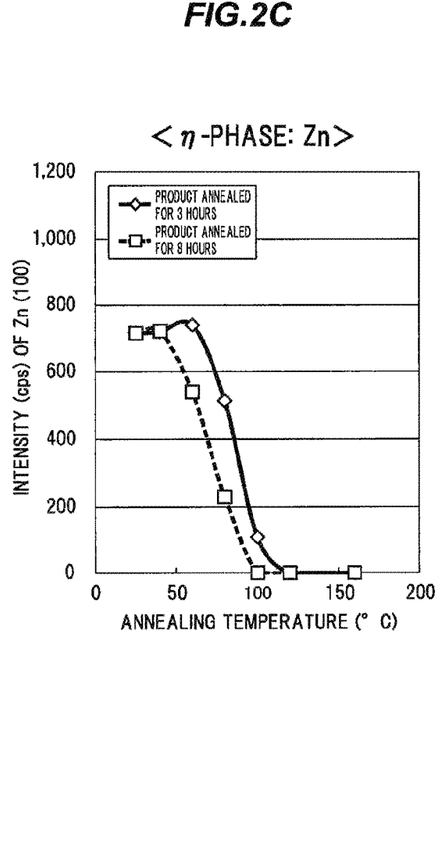
FIG. 2C shows the result of x-ray diffraction intensity measurement, which is the result of measuring intensity of (100) of the η-phase (Zn) at respective annealing temperatures.

Electrical discharge machining electrode wires were made by the following method and were subjected to x-ray diffraction intensity measurement. FIGS. 2A to 2C show the results of x-ray diffraction intensity measurement, wherein FIG. 2A is the result of measuring intensity of (0001) of the ε-phase ($CuZn_5$) at respective annealing temperatures, FIG. 2B is the result of measuring intensity of (332) of the γ-phase ($Cu_5Zn_8$) at respective annealing temperatures, and FIG. 2C is the result of measuring intensity of (100) of the η-phase (Zn) at respective annealing temperatures. In FIGS. 2A to 2C, a plot at 25° C. is the measurement result of a non-annealed electrical discharge machining electrode wire.

Using a zinc electroplating method, a zinc plating layer having a thickness of about 10 μm was formed on a brass wire (diameter: 1.2 mm) as the core 1. The core 1 plated with zinc was drawn to a diameter of 0.20 mm (to 1.7 μm of the plating layer), was then wound onto a bobbin (F10: spindle diameter of 100 mm), and was annealed in this state, thereby making 10 kg each of electrical discharge machining electrode wires. The annealing conditions were 40 to 160° C. (40, 60, 100, 120 or 160° C.) for 3 hours or for 8 hours.

It is understood from FIGS. 2A and 2B that, at the annealing temperature of not more than 120° C., the x-ray diffraction intensity of (0001) of the ε-phase is more than twice the x-ray diffraction intensity of (332) of the γ-phase when annealing time was 3 hours and also 8 hours. Meanwhile, an x-ray diffraction intensity of (100) of the η-phase (Zn) was 0 when annealed at a temperature of 100° C. or more for 8 hours and when annealed at a temperature of 120° C. or more for 3 hours (FIG. 2C). The η-phase is a pure Zn phase and is likely produce abrasion powder due to its softness, which accumulates as debris on a pass line of an electrical discharge machine. Therefore, the η-phase is preferably eliminated by heat treatment, and it is understood that this requires heat treatment at not less than 100° C.

Based on the above, heat treatment at 100° C. to 120° C. is optimal.

[Evaluation of Straightness]

Figure 3:
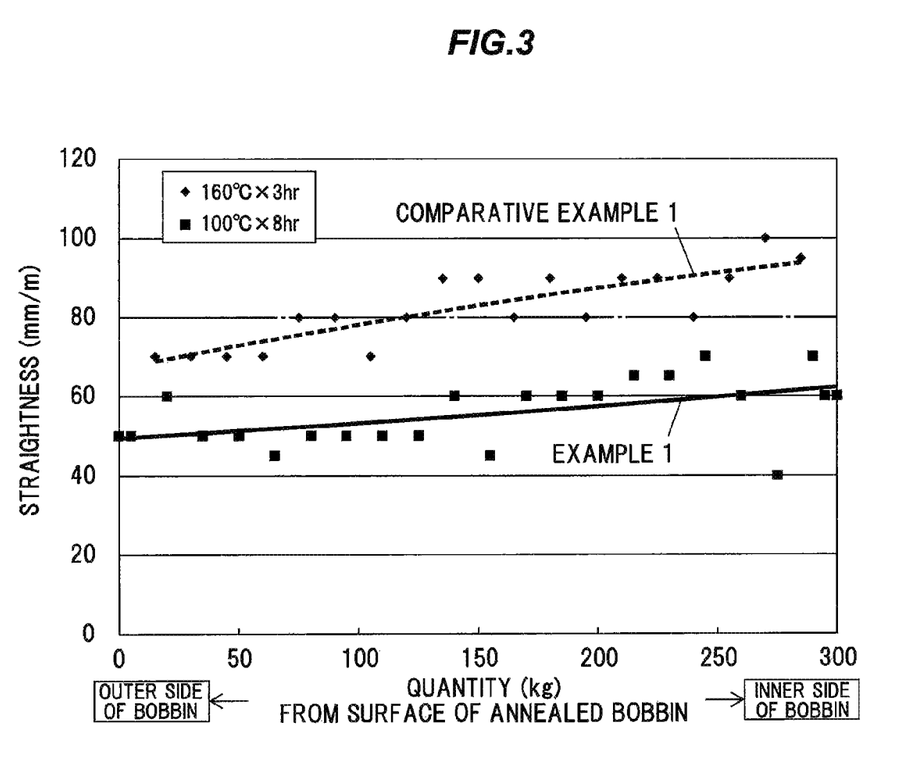
FIG. 3 is a graph showing the result of straightness evaluation for Example and Comparative Example.

Electrical discharge machining electrode wires were made by the following method and were evaluated for straightness. FIG. 3 is a graph showing the result of straightness evaluation for Example and Comparative Example and FIG. 4 is a diagram illustrating a method of measuring straightness.

Using a zinc electroplating method, a zinc plating layer having a thickness of about 10 μm was formed on a brass wire (diameter: 1.2 mm) as the core 1. The core 1 plated with zinc was drawn to a diameter of 0.20 mm (to 1.7 μm of the plating layer), was then wound onto a bobbin (F350: spindle diameter of 340 mm), and was annealed in this state, thereby making 300 kg each of electrical discharge machining electrode wires. The annealing conditions were 100° C. for 8 hours (in Example 1) and 160° C. for 3 hours (in Comparative Example 1).

Figure 4:
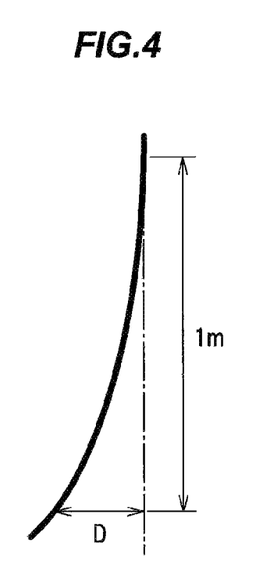
FIG. 4 is a diagram illustrating a method of measuring straightness.

The straightness was evaluated based on measurement of the amount of warpage (indicated by "D" (distance) in FIG. 4) per 1 meter from an axis along the vertical direction when the electrical discharge machining electrode wire is suspended vertically as shown in FIG. 4. The warpage was measured sequentially once every 10 to 15 kg from the electrical discharge machining electrode wire located on the outer side of the bobbin. On the inner side of the bobbin, the diameter is smaller and the warpage is thus larger.

It is understood from FIG. 3 that the amount of warpage in Example 1 was not more than 80 mm/m (within a range of 40 to 70 mm/m) over the entire length. A difference between the maximum amount and minimum amount of warpage was not more than 30 mm/m. On the other hand, in Comparative Example 1, the amount of warpage was in a range of 60 to 100 mm/m, and the electrode wire located at or inward of about 75 kg from the outer side of the bobbin had a warpage of not less than 80 mm/m.

[Evaluation of Relation Between Straightness and Automatic Wire Threading Performance]

Figure 5:
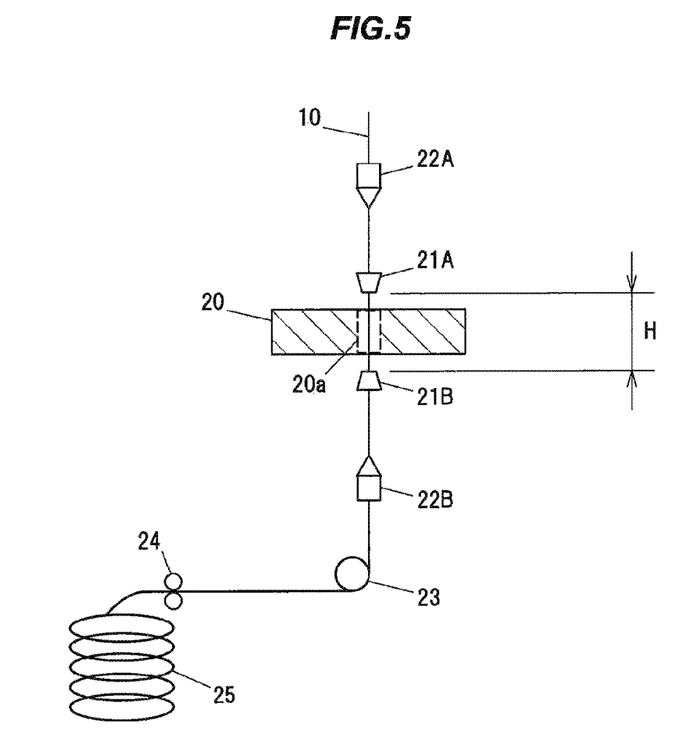
FIG. 5 is a schematic diagram illustrating a device used to evaluate a relation between straightness and automatic wire threading performance.

Electrical discharge machining electrode wires were made by the following method, and an effect of straightness (amount of warpage=distance) on the automatic wire threading rate was evaluated. FIG. 5 is a schematic diagram illustrating a device used to evaluate a relation between straightness and automatic wire threading performance (Example)

Using a zinc electroplating method, a zinc plating layer having a thickness of about 10 μm was formed on a brass wire (diameter: 1.2 mm) as the core 1. The core 1 plated with zinc was drawn to a diameter of 0.25 mm (to 2.1 μm of the plating layer), was then wound onto a bobbin (F-350: spindle diameter of 340 mm) and annealed in this state, and was sequentially rewound onto another bobbin (P-5RT: spindle diameter of 100 mm), thereby making 5 kg each of electrical discharge machining electrode wires. Under the annealing conditions of 100° C. for 8 hours, electrical discharge machining electrode wires having straightness (warpage) of 40 to 80 mm were made.

(Comparative Example)

Using a zinc electroplating method, a zinc plating layer having a thickness of about 10 μm was formed on a brass wire (diameter: 1.2 mm) as the core 1. The core 1 plated with zinc was drawn to a diameter of 0.25 mm (to 2.1 μm of the plating layer), was then wound onto a bobbin (F-350: spindle diameter of 340 mm) and annealed in this state, and was sequentially rewound onto another bobbin (P-5RT: spindle diameter of 100 mm), thereby making 5 kg each of electrical discharge machining electrode wires. Under the annealing conditions of 160° C. for 3 hours, electrical discharge machining electrode wires having straightness (warpage) of 90 to 110 mm were made.

The electrode wire 10 obtained in Example or Comparative Example was placed on a device as shown in FIG. 5, and a workpiece 20 was then machined. In detail, the electrode wire 10 was inserted through an upper guide die 22A and a lower guide die 22B and the workpiece 20 was processed so that a hole 20a was formed. An upper nozzle 21A and a lower nozzle 21B spray a jet of water to facilitate automatic insertion of the electrode wire 10 into the hole 20a (serve to assist insertion of the electrode wire into a prepared hole by covering the wire with a 2 mm-diameter column of water at a water pressure of about 2 $kgf/cm^2$). A Z-axis height H shown in FIG. 5 is a distance from the lower edge of the upper nozzle 21A to the upper edge of the lower nozzle 21B and can be adjusted between 0.1 mm to 1500 mm depending on the size of electrical discharge machine. In this Example, FK-K (product name) manufactured by Mitsubishi Electric Corporation was used as the electrical discharge machine, the prepared hole was fixed at Φ3 mm, and the test was conducted at the respective Z-axis heights H of 50, 100 and 150 mm. Automatic wire threading becomes more difficult with an increase in the Z-axis height. The electrode wire 10 which was broken was collected as a scrap wire 25 via a roller 23 and a collection roller 24.

The measurement was continuously conducted 50 times, and the automatic wire threading rate of not less than 80% at all Z-axis heights of 50, 100 and 150 mm was regarded as practically problem free. Although wire threading is automatically retried after each failure, successful threading achieved by only one try was counted as one success. Table 1 shows the result.

TABLE 1

| | Straightness (amount of warpage) mm | Frequency of automatic wire threading (automatic wire threading rate) | | |
|---|---|---|---|---|
| | | Z-axis height: 50 mm | Z-axis height: 100 mm | Z-axis height: 150 mm |
| Example | 40 | 50/50 (100%) | 50/50 (100%) | 50/50 (100%) |
| | 50 | 50/50 (100%) | 50/50 (100%) | 50/50 (100%) |
| | 60 | 50/50 (100%) | 50/50 (100%) | 47/50 (94%) |
| | 70 | 50/50 (100%) | 49/50 (98%) | 43/50 (86%) |
| | 80 | 50/50 (100%) | 47/50 (94%) | 40/50 (80%) |
| Comparative Example | 90 | 50/50 (100%) | 44/50 (88%) | 32/50 (64%) |
| | 100 | 50/50 (100%) | 41/50 (82%) | 25/50 (50%) |
| | 110 | 50/50 (100%) | 36/50 (72%) | 8/50 (16%) |

It can be seen from Table 1 that the automatic wire threading rate of the electrode wires having straightness (amount of warpage) of not more than 80 mm was not less than 80% at all Z-axis heights of 50, 100 and 150 mm. In other words, the electrical discharge machining electrode wire of the invention can maintain a high automatic wire threading rate even when the distance for automatic insertion is long.

The invention is not intended to be limited to the embodiment, and the various kinds of modifications can be implemented.

REFERENCE SIGNS LIST

1: CORE
2: COVERING LAYER
2A: INNER LAYER (γ-PHASE)
2B: OUTER LAYER (ε-PHASE)
10: ELECTRICAL DISCHARGE MACHINING ELECTRODE WIRE
20: WORKPIECE
20a: HOLE
21A: UPPER NOZZLE
21B: LOWER NOZZLE
22A: UPPER GUIDE DIE
22B: LOWER GUIDE DIE
23: ROLLER
24: COLLECTION ROLLER
25: SCRAP WIRE

The invention claimed is:

1. An electrical discharge machining electrode wire, comprising:
   a core comprising copper or a copper alloy; and
   a covering layer covering a periphery of the core and including zinc,
   wherein the covering layer comprises an inner layer including a γ-phase of copper-zinc based alloy and covering the periphery of the core, and an outer layer including an ε-phase of copper-zinc based alloy and covering a periphery of the inner layer,
   wherein an x-ray diffraction intensity of (0001) of the ε-phase is more than twice an x-ray diffraction intensity of (332) of the γ-phase, and
   wherein an amount of warpage from an axis along a vertical direction is not less than 40 mm/m and not more than 80 mm/m when the electrical discharge machining electrode wire is suspended vertically after annealing with wound onto a bobbin.

2. The electrical discharge machining electrode wire according to claim 1, wherein the outer layer is an outermost layer.

3. The electrical discharge machining electrode wire according to claim 2, wherein the core comprises a brass.

4. The electrical discharge machining electrode wire according to claim 1, wherein the core comprises a brass.

5. The electrical discharge machining electrode wire according to claim 1, wherein the outer layer is an outermost layer.

6. The electrical discharge machining electrode wire according to claim 1, wherein the core comprises a brass.

7. The electrical discharge machining electrode wire according to claim 1, wherein the electrical discharge machining electrode wire is produced by:
   plating the core with the zinc;
   drawing the plated core; and
   after the drawing and then winding the plated core onto the bobbin, heat treating in a heat treatment condition in a range from 100° C. to 120° C. for 3 hours to 24 hours.

8. The electrical discharge machining electrode wire according to claim 7, wherein the heat treatment condition is in the range from 100° C. to 120° C. for 3 hours to 18 hours.

9. The electrical discharge machining electrode wire according to claim 7, Wherein the heat treating under the heat treatment condition is conducted for 3 hours to 7 hours when the covering layer has a thickness of less than 1.5 μm.

10. The electrical discharge machining electrode wire according to claim 9, the heat treating under the heat treatment condition is conducted for 7 hours to 18 hours when the covering layer has the thickness of not less than 1.5 μm.

11. The electrical discharge machining electrode wire according to claim 1, wherein the amount of warpage is in a range from 40 mm/m to 70 mm/m.

12. The electrical discharge machining electrode wire according to claim 1, wherein a difference between a maximum amount of the warpage and a minimum amount of the warpage is at most 30 mm/m.

13. The electrical discharge machining electrode wire according to claim 1, wherein the amount of warpage is not less than 40 mm/m and not more than 80 mm/m over an entire length of the electrical discharge machining electrode wire.

14. A method for manufacturing an electrical discharge machining electrode wire comprising a core comprising copper or a copper alloy and a covering layer covering a periphery of the core and including zinc, the method comprising:

plating the core with a zinc or a zinc alloy once;

drawing the plated core; and after the thawing and then winding the plated core onto a bobbin, heat treating in a heat treatment condition under which the covering layer comprises an inner layer including a γ-phase of copper-zinc based alloy and an outer layer including an ε-phase of copper-zinc based alloy and coveting a periphery of the inner layer, an x-ray diffraction intensity of (0001) of the ε-phase is more than twice an x-ray diffraction intensity of (332) of the γ-phase, and the heat treatment condition is in a range from 100° C. to 120° C. for 3 hours to 24 hours, wherein an amount of warpage from an axis along a vertical direction is not less than 40 mm/m and not more than 80 mm/m when the electrical discharge machining electrode wire is suspended vertically after annealing with wound onto the bobbin.

15. The method according to claim 14, wherein the heat treatment condition is in the mime from 100° C. to 120° C. for 3 hours to 18 hours.

16. The method according to claim 14, wherein the heat treating milder the heat treatment condition is conducted for 3 hours to 7 hours when the covering layer has a thickness of less than 1.5 μm.

17. The method according to claim 16, wherein the heat treating under the heat treatment condition is conducted for 7 hours to 18 hours when the covering layer has the thickness of not less than 1.5 μm.

18. The method according to claim 14, wherein the amount of warpage is in a range from 40 mm/m to 70 mm/m.

19. The method according to claim 14, wherein a difference between a maximum amount of the warpage and a minimum amount of the warpage is at most 30 mm/m.

* * * * *